Figure 1:
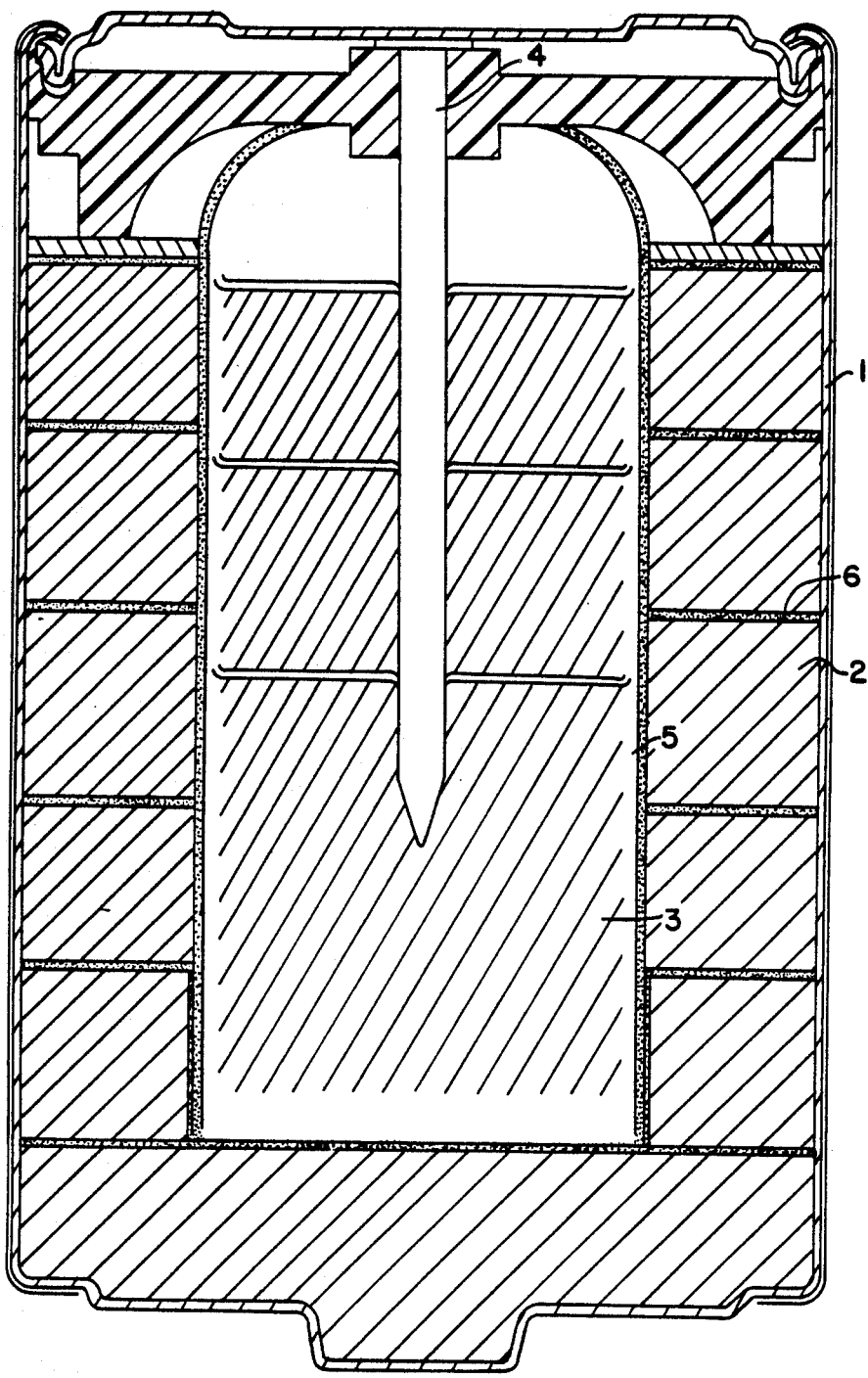

United States Patent [19]

Kordesch et al.

[11] Patent Number: 4,929,520

[45] Date of Patent: May 29, 1990

[54] RECHARGEABLE ALKALINE MANGANESE DIOXIDE-ZINC CELL WITH LOW INTERNAL RESISTANCE AND IMPROVED CYCLE LIFE

[75] Inventors: Karl Kordesch; Wilhelm Harer, both of Graz, Austria

[73] Assignee: Battery Technologies Inc., Canada

[21] Appl. No.: 335,290

[22] Filed: Apr. 10, 1989

[30] Foreign Application Priority Data

Apr. 11, 1988 [CA] Canada ................................ 563843

[51] Int. Cl.$^5$ ........................ H01M 2/18; H01M 6/10
[52] U.S. Cl. ........................ 429/94; 429/233; 429/247
[58] Field of Search ............... 429/94, 233, 241, 245, 429/247

[56] References Cited

U.S. PATENT DOCUMENTS

| | | | |
|---|---|---|---|
| 3,811,955 | 5/1974 | Ralston et al. | 429/94 X |
| 4,091,178 | 5/1978 | Kordesch | 429/94 X |
| 4,251,603 | 2/1981 | Matsumoto et al. | 429/94 |
| 4,650,680 | 3/1987 | Brenner et al. | 429/94 X |

Primary Examiner—Stephen J. Kalafut
Attorney, Agent, or Firm—Donald E. Hewson

[57] ABSTRACT

Rechargeable alkaline manganese dioxide - zinc cell of the type comprising a metal container including a porous cathode consisting of a plurality of adjoining blocks, a zinc anode and a separator separating the cathode and anode, and an electrolyte impregnating the cathode and contacting with said separator and anode, in which a cloth-like material like graphite cloth, nickel sinter or other fabric material (which wet the electrolyte) is inserted between otherwise contacting blocks of the cathode body and it substantially decreases internal resistance owing to the fact that the electrolyte impregnates the porous cloth material and will thus have a larger contacting area with the cathode body.

8 Claims, 1 Drawing Sheet

RECHARGEABLE ALKALINE MANGANESE DIOXIDE-ZINC CELL WITH LOW INTERNAL RESISTANCE AND IMPROVED CYCLE LIFE

The invention relates to a rechargeable alkaline manganese dioxide—zinc cell with low internal resistance and improved cycle life, more particularly to the design of the manganese dioxide cathode to have improved electrical performance.

Alkaline manganese dioxide zink cells have a positive electrode (cathode) which consists—in accordance with the the state of the art—of a mixture of manganese dioxide (80-90%) and acetylene black (0.5-1%). This mixture is usually wetted with electrolyte solution and is pressed or extruded into various shapes like sleeves, cylinders, rings, blocks, disks, pellets etc. which fit into a cathode container usually formed by a deep drawn steel can. The various considerations for such batteries are summarized e.g. in the book "Batteries", Volume 1 entitled "Manganese Dioxide", edited by Karl Kordesch (Marcel Dekker, Inc. New York 1974).

The pressure acting on the manganese dioxide cathode is usually high (2 to 4 tons/cm$^2$) in order to obtain a strong coherent body. Sometimes a binding agent is added. The result is a rather dense cathode which, due to its often hydrophobic carbon content does not readily soak up the amount of electrolyte required to establish enough ionic conductivity for the progress of cathodic reaction to proceed at high current. The cathode exhibits a high resistance behavior and also shows a reduced utilization of the manganese dioxide. Inspite of a prolonged period of vacuum impregnation (e.g. over night), using a strong solution of potassium hydroxide (40% KOH) the problem persists and results in product variations and early cycle failures (drying-out) of the rechargeable cathode.

The need for a thorough impregnation of porous manganese dioxide cathodes with electrolyte is well known, therefore many ways are suggested in the technical literature to achieve it within a reasonable time and reliability. It was e.g. suggested to mix fibres into the cathode body to act like wicks. Microporous non-conducting materials, like asbestos were used frequently. These materials functioned well in primary cells, but in rechargeable cells where a strong cathode, lasting for hundreds for cycles is required, they failed, in most cases getting plugged or heavily coated with an insulating layer, which increased the cathode resistance. Swelling materials (like asbestos, silica-gel, cellulosic materials, gypsum and others) even disrupted the internal particle contact of the cathodes, thereby destroyed rechargeability. The addition of steel wool or graphite fibers was suggested in U.S. Pat. No. 2,960,558 issued to P. A. Marsal, K. Kordesch and L. F. Urry, to act as structure-strengthening materials and as conductivity increasing additions, with some success.

The primary object of the present invention is to provide an improved manganese dioxide rechargeable battery, in which the internal resistance can be improved by decreasing the cathode resistance or in other words the contact efficiency between the electrolyte and the manganese dioxide mass.

It has been recognised according to the present invention that the insertion of cloth-like materials like graphite cloth, nickel sinter or other fabric material (which wet the electrolyte) between otherwise contacting blocks of the cathode body substantially decreases internal resistance owing to the fact that the electrolyte impregnates the porous material and will thus have a larger contacting area with the cathode body. It is preferable if the cloth material is electrically conductive.

The cathode blocks are often hollow cylindrical disks attached to one another to form a hollow cylindrical cathode body. The cloth material can take the form of flat rings conforming with the face of the blocks and they can be inserted between the blocks. It has been experienced that already one ring can exert a remarkable influence on the cathode performance and further improvement is connected with the application of increased number of rings. If this number is increased above about five, the electrical properties will not improve any more, since thereby a sufficient contact is provided to the cathode material.

The invention will now be described in connection with preferable embodiments thereof, in which reference will be made to the accompanying drawing. The drawing shows the enlarged cross sectional view of a cylindrical alkaline manganese dioxide rechargeable battery.

In a deep drawn steel container 1 hollow cylindrical blocks 2 of manganese dioxide cathode are arranged closely side by side to each other. The cathode defines a cylindrical central space, in which a substantially cylindrical zinc anode 3 is inserted. A contacting metal rod 4 extends in the interior of the anode 3 to lead out the negative pole of the battery. The mantle surface of the anode body is encircled by a separator 5 of a semipermeable material which ensures ionic conduction between the anode and the cathode. Appropriate sealing and closure members are used to hermetically seal the interior of the battery.

In the cathode structure flat rings 6 of graphite cloth are placed between the cylindrical blocks 2. Such blocks can be made preferably by the various types of graphite fabric made e.g. by the SIGRI Electrographit GmbH. (Meitingen, Germany). Before the full sealing of the battery structure the assembly is vaccuum impregnated with potassium hydroxide electrolyte, preferably for a period of a couple of hours. The electrolyte impregnates the rings 6 acting like the wick in a candle and the contact resistance between the electrolyte and the manganese dioxide blocks and between the blocks 2 and the metal container 1 is decreased. The difference compared to the battery according to the invention and conventional batteries lies only in the application of the rings 6 of cloth material.

A test series was performed with 10 D-size batteries made according to the invention and with reference batteries in which the rings 6 were not used so that the blocks 2 were attached to one-another. The average short circuit current of the reference new batteries was 11 A, while the similar short circuit current of the batteries wth rings 6 was 27 A. The values were varying between about 25 and 28 A.

After 50 charging and discharging cycles the storage capacity of the new batteries was 7.65 Ah compared to 6.7 Ah of the reference group.

To invesigate the heavy-load durability of the batteries a particularly heavy discharge test was perforated for receiver-transmitter application, in which the voltage must not drop under the limit of 1.0 V. The cycle life of the new batteries went up to 60 cycles compared to the 30 cycle lifetime of the reference group.

The term conductive fibre cloth should cover all porous materials including the so called graphitized carbon paper produced e.g. by the TOYOBO CO. LTD. Osaka, Japan or various sintered or fibre porous material.

We claim:

1. Rechargeable alkaline manganese dioxide—zinc cell of the type comprising a metal container including a porous cathode consisting of a plurality of adjoining blocks, a zinc anode and a separator separating the cathode and anode, and an electrolyte impregnating said cathode and contacting with said separator and anode, characterized in that an electrically conducting cloth member is arranged between said blocks, said member comprising fibres wetted by said electrolyte to increase conductivity between said electrolyte and said blocks.

2. The rechargeable alkaline manganese dioxide—zinc cell as claimed in claim 1, wherein said member includes graphite or carbon fabric.

3. The rechargeable alkaline manganese dioxide—zinc cell as claimed in claim 1, wherein said member includes sintered nickel fibres.

4. The rechargeable alkaline manganese dioxide—zinc cell as claimed in claim 1, wherein said blocks are hollow cylinders and said member is a flat ring conforming to the annular face of said blocks.

5. The rechargeable alkaline manganese dioxide—zinc cell as claimed in claim 1, wherein said member is vacuum impregnated by said electrolyte.

6. The rechargeable alkaline manganese dioxide—zinc cell as claimed in claim 1, wheein said member extend up to said container.

7. The rechargeable alkaline manganese dioxide—zinc cell as claimed in claim 4, wherein the number of said rings is at most 6.

8. The rechargeable alkaline manganese dioxide—zinc cell as claimed in claim 4, wherein respective rings are arranged between each of said adjoining blocks.

* * * * *